US011801698B2

(12) United States Patent
Matsumura

(10) Patent No.: US 11,801,698 B2
(45) Date of Patent: Oct. 31, 2023

(54) INFORMATION PROCESSING DEVICE, TAPE PRINTING SYSTEM, CONTROL METHOD OF INFORMATION PROCESSING DEVICE, AND STORAGE MEDIUM

(71) Applicant: SEIKO EPSON CORPORATION, Tokyo (JP)

(72) Inventor: Kai Matsumura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 98 days.

(21) Appl. No.: 17/674,189

(22) Filed: Feb. 17, 2022

(65) Prior Publication Data

US 2022/0258511 A1 Aug. 18, 2022

(30) Foreign Application Priority Data

Feb. 18, 2021 (JP) ................................ 2021-024016

(51) Int. Cl.
*B41J 3/407* (2006.01)
*B41J 29/393* (2006.01)
*B41J 15/04* (2006.01)
*G06F 3/12* (2006.01)

(52) U.S. Cl.
CPC ........... *B41J 29/393* (2013.01); *B41J 3/4075* (2013.01); *B41J 15/044* (2013.01); *G06F 3/1293* (2013.01)

(58) Field of Classification Search
CPC ........ B41J 3/4075; B41J 15/044; B41J 32/00; B41J 29/393; G06F 3/1293
See application file for complete search history.

(56) References Cited

U.S. PATENT DOCUMENTS

| 2009/0231367 A1* | 9/2009 | Tsuchiya | B41J 2/16517 347/7 |
| 2014/0307268 A1 | 10/2014 | Sun | |
| 2018/0001675 A1* | 1/2018 | Handa | G06K 15/404 |
| 2022/0129221 A1* | 4/2022 | Ueda | G06F 3/1256 |

FOREIGN PATENT DOCUMENTS

JP 2014-203436 A 10/2014

* cited by examiner

*Primary Examiner* — Kristal Feggins
(74) *Attorney, Agent, or Firm* — Oliff PLC

(57) ABSTRACT

An information processing device includes an attached-cartridge information obtainer configured to, for a plurality of tape printing apparatuses with which the information processing device is able to communicate, obtain attached-cartridge information indicating types of tape cartridges respectively attached to the tape printing apparatuses, a target tape information obtainer configured to obtain target tape information indicating a type of a target tape desired as a printing target by a user, a first determiner configured to determine, based on the attached-cartridge information for the plurality of tape printing apparatuses and the target tape information, whether the plurality of tape printing apparatuses include an attached-tape printing apparatus to which a target tape cartridge containing the target tape is attached, and a display controller configured to, when it is determined that the plurality of tape printing apparatuses include the attached-tape printing apparatus, cause attached-apparatus information indicating the attached-tape printing apparatus to be displayed.

7 Claims, 10 Drawing Sheets

FIG. 5

| MODEL NAME | CORRESPONDING-CARTRIDGE INFORMATION | | | ATTACHED-CARTRIDGE INFORMATION | | |
|---|---|---|---|---|---|---|
| | CORRESPONDING TAPE TYPE | STANDARD TAPE WIDTH | DIE-CUT TAPE WIDTH | ATTACHED-TAPE WIDTH | ATTACHED-TAPE COLOR | ATTACHED-TAPE TYPE |
| PR-1 | STANDARD TAPE | 24 mm OR LESS | — | 18 mm | WHITE | STANDARD TAPE |
| PR-2 | STANDARD TAPE DIE-CUT TAPE | 36 mm OR LESS | 40 mm OR LESS | 40 mm | RED | DIE-CUT TAPE |
| PR-3 | STANDARD TAPE | 50 mm OR LESS | — | 18 mm | WHITE | STANDARD TAPE |

FIG. 8

TARGET TAPE INFORMATION INPUT

| TAPE WIDTH | 2 4 mm | ▼ | —61 |
| TAPE COLOR | RED | ▼ | —62 |
| TAPE TYPE | DIE-CUT TAPE | ▼ | —63 |

CANCEL   OK
  64      65

FIG. 9

CORRESPONDING-TAPE PRINTING APPARATUS

| MODEL NAME | ATTACHED-TAPE WIDTH | ATTACHED-TAPE COLOR | ATTACHED-TAPE TYPE |
|---|---|---|---|
| PR-2 | 4 0 mm | RED | DIE-CUT TAPE |

REPLACE TAPE CARTRIDGE OF ABOVE MODEL

CANCEL   OK
  73      74

INFORMATION PROCESSING DEVICE, TAPE PRINTING SYSTEM, CONTROL METHOD OF INFORMATION PROCESSING DEVICE, AND STORAGE MEDIUM

BACKGROUND

The present application is based on, and claims priority from JP Application Serial Number 2021-024016, filed Feb. 18, 2021, the disclosure of which is hereby incorporated by reference herein in its entirety.

1. Technical Field

The present disclosure relates to an information processing device, a tape printing system, a control method of an information processing device, and a storage medium.

2. Related Art

As disclosed in JP-A-2014-203436, there is known an information processing device that is communicably connected to a plurality of tape printing apparatuses, that obtains respective pieces of identification information of the tape printing apparatuses and medium information indicating tapes respectively attached to the tape printing apparatuses, and that displays a list of the obtained respective pieces of identification information of the plurality of tape printing apparatuses and medium information.

In the document mentioned above, when a large number of tape printing apparatus are connected to an information processing device, the information processing device takes a long time to find a tape printing apparatus to which a tape desired as a printing target by the user is attached.

SUMMARY

An information processing device according to an aspect of the present disclosure is an information processing device to which a plurality of tape printing apparatuses, to which tape cartridges are able to be attached, are communicably connected. The information processing device includes an attached-cartridge information obtainer configured to, for the plurality of tape printing apparatuses, obtain attached-cartridge information indicating types of the tape cartridges respectively attached to the tape printing apparatuses, a target tape information obtainer configured to obtain target tape information indicating a type of a target tape that is a tape desired as a printing target by a user, a first determiner configured to determine, based on the attached-cartridge information for the plurality of tape printing apparatuses and the target tape information, whether the plurality of tape printing apparatuses include an attached-tape printing apparatus to which a target tape cartridge containing the target tape is attached, and a display controller configured to, when it is determined by the first determiner that the plurality of tape printing apparatuses include the attached-tape printing apparatus, cause a display to display attached-apparatus information indicating the attached-tape printing apparatus.

A tape printing system according to an aspect of the present disclosure includes a plurality of tape printing apparatuses to which tape cartridges are able to be attached, and an information processing device to which the plurality of tape printing apparatuses are communicably connected. The information processing device includes an attached-cartridge information obtainer configured to, for the plurality of tape printing apparatuses, obtain attached-cartridge information indicating types of the tape cartridges respectively attached to the tape printing apparatuses, a target tape information obtainer configured to obtain target tape information indicating a type of a target tape that is a tape desired as a printing target by a user, a first determiner configured to determine, based on the attached-cartridge information for the plurality of tape printing apparatuses and the target tape information, whether the plurality of tape printing apparatuses include an attached-tape printing apparatus to which a target tape cartridge containing the target tape is attached, and a display controller configured to, when it is determined by the first determiner that the plurality of tape printing apparatuses include the attached-tape printing apparatus, cause a display to display attached-apparatus information indicating the attached-tape printing apparatus.

A control method of an information processing device according to an aspect of the present disclosure is a control method of an information processing device to which a plurality of tape printing apparatuses, to which tape cartridges are able to be attached, are communicably connected. The control method includes obtaining, for the plurality of tape printing apparatuses, attached-cartridge information indicating types of the tape cartridges respectively attached to the tape printing apparatuses, obtaining target tape information indicating a type of a target tape that is a tape desired as a printing target by a user, determining, based on the attached-cartridge information for the plurality of tape printing apparatuses and the target tape information, whether the plurality of tape printing apparatuses include an attached-tape printing apparatus to which a target tape cartridge containing the target tape is attached, and causing a display to display attached-apparatus information indicating the attached-tape printing apparatus, when it is determined that the plurality of tape printing apparatuses include the attached-tape printing apparatus.

A non-transitory computer-readable storage medium according to an aspect of the present disclosure stores a program that causes an information processing device to execute a process. A plurality of tape printing apparatuses, to which tape cartridges are able to be attached, are communicably connected to the information processing device. The process includes obtaining, for the plurality of tape printing apparatuses, attached-cartridge information indicating types of the tape cartridges respectively attached to the tape printing apparatuses, obtaining target tape information indicating a type of a target tape that is a tape desired as a printing target by a user, determining, based on the attached-cartridge information for the plurality of tape printing apparatuses and the target tape information, whether the plurality of tape printing apparatuses include an attached-tape printing apparatus to which a target tape cartridge containing the target tape is attached, and causing a display to display attached-apparatus information indicating the attached-tape printing apparatus, when it is determined that the plurality of tape printing apparatuses include the attached-tape printing apparatus.

BRIEF DESCRIPTION OF THE DRAWINGS

FIG. 5 is a table illustrating an example of corresponding-cartridge information and attached-cartridge information.

FIG. 8 is a diagram illustrating a display example of the target tape information input screen, which is different from FIG. 6.

FIG. 9 is a diagram illustrating a display example of a corresponding-tape printing apparatus screen.

DESCRIPTION OF EXEMPLARY EMBODIMENTS

Figure 1:
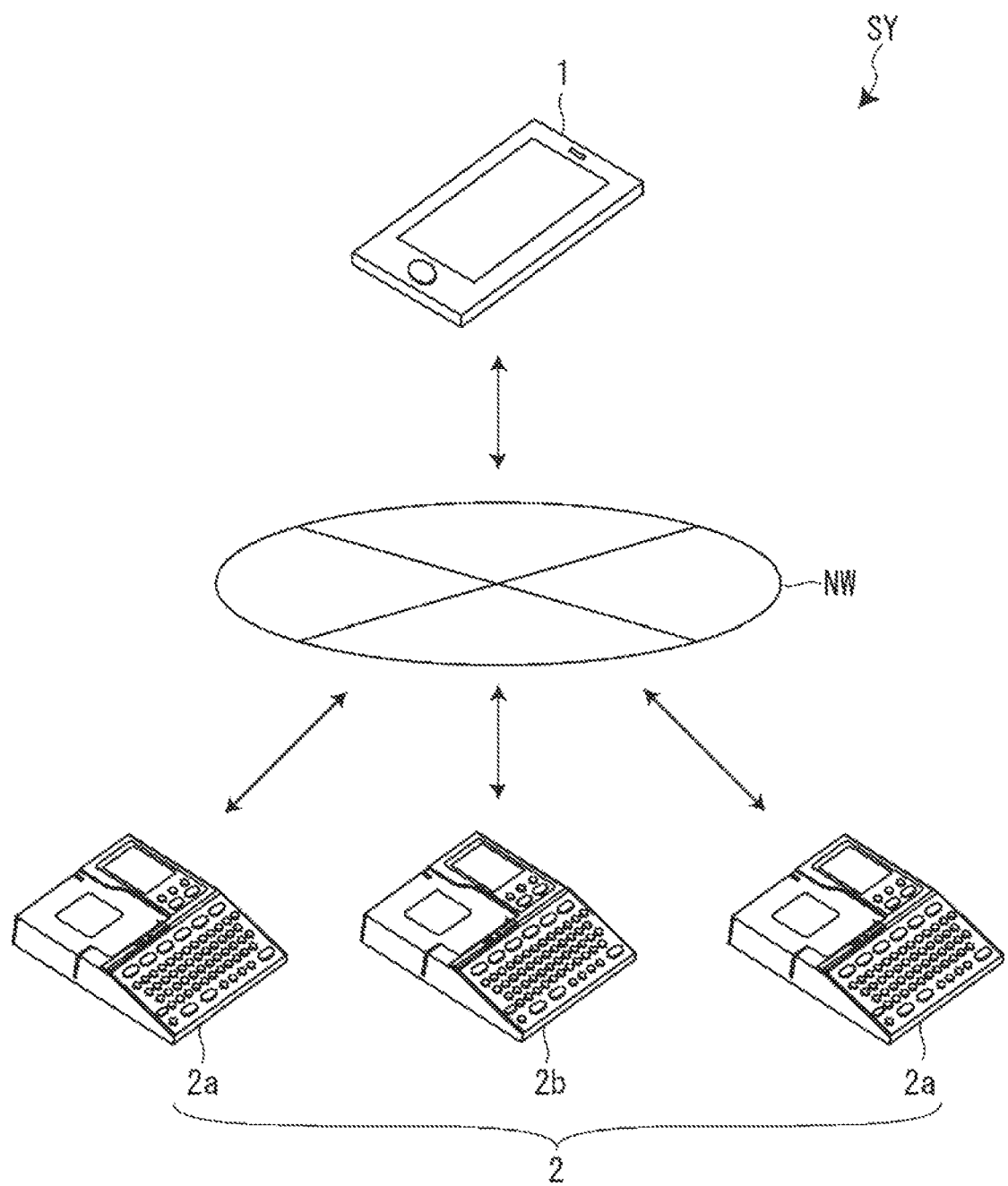
FIG. 1 is a system configuration diagram of a tape printing system.

Hereinafter, an information processing device, a tape printing system, a control method of an information processing device, and a storage medium will be described below with reference to the accompanying drawings. FIG. 1 is a system configuration diagram of a tape printing system SY. The tape printing system SY includes a portable terminal 1 and a plurality of tape printing apparatuses 2, which are communicably connected via a network NW. The portable terminal 1 is an example of an "information processing device". The network NW is, for example, wireless local area network (LAN).

Figure 3:
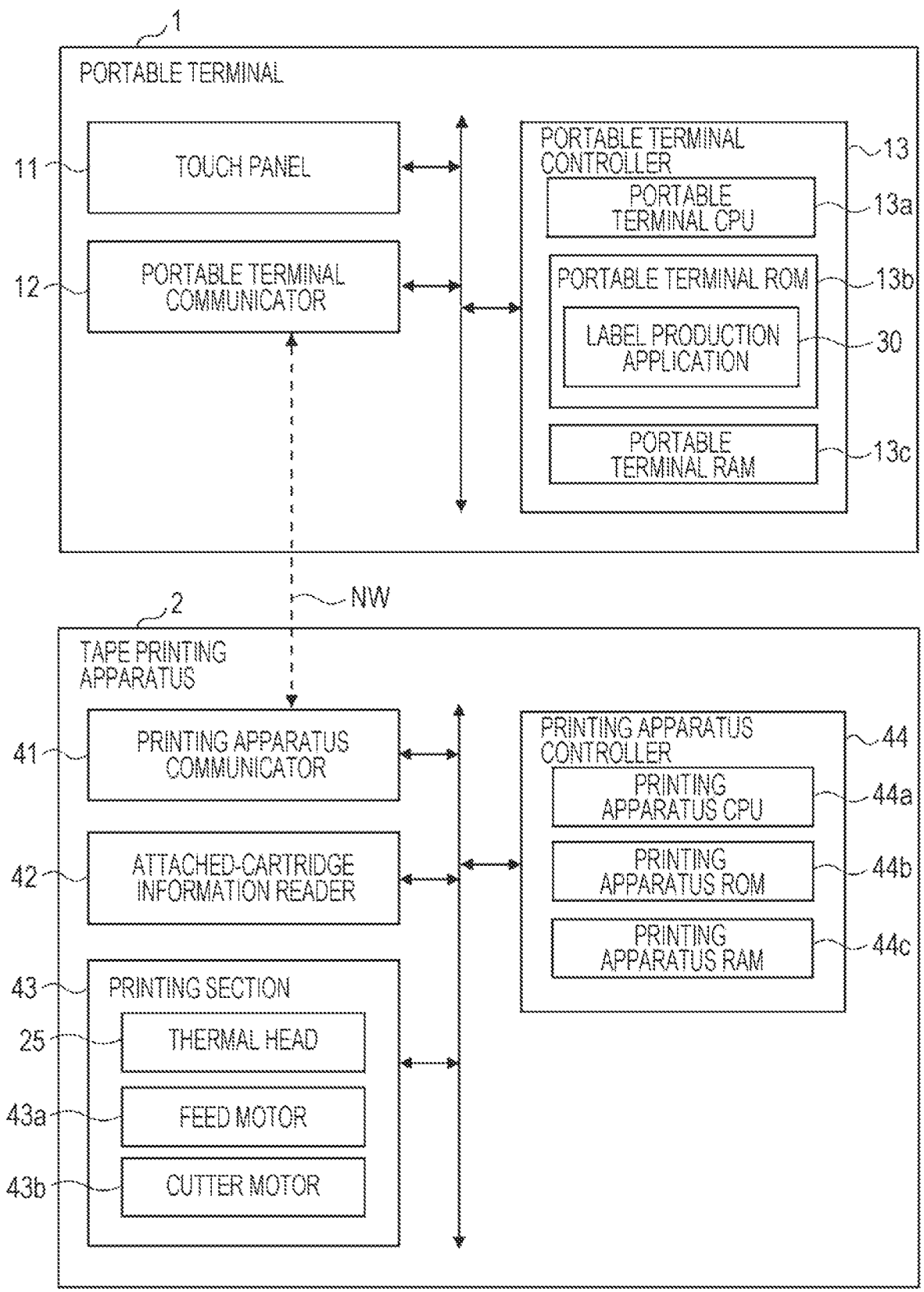
FIG. 3 is a block diagram illustrating hardware configurations of a portable terminal and the tape printing apparatus.

As illustrated in FIG. 3, a label production application 30 with which the portable terminal 1 cooperating with the tape printing apparatus 2 produces a label is installed in the portable terminal 1. The label production application 30 is an example of a "program".

Figure 2:
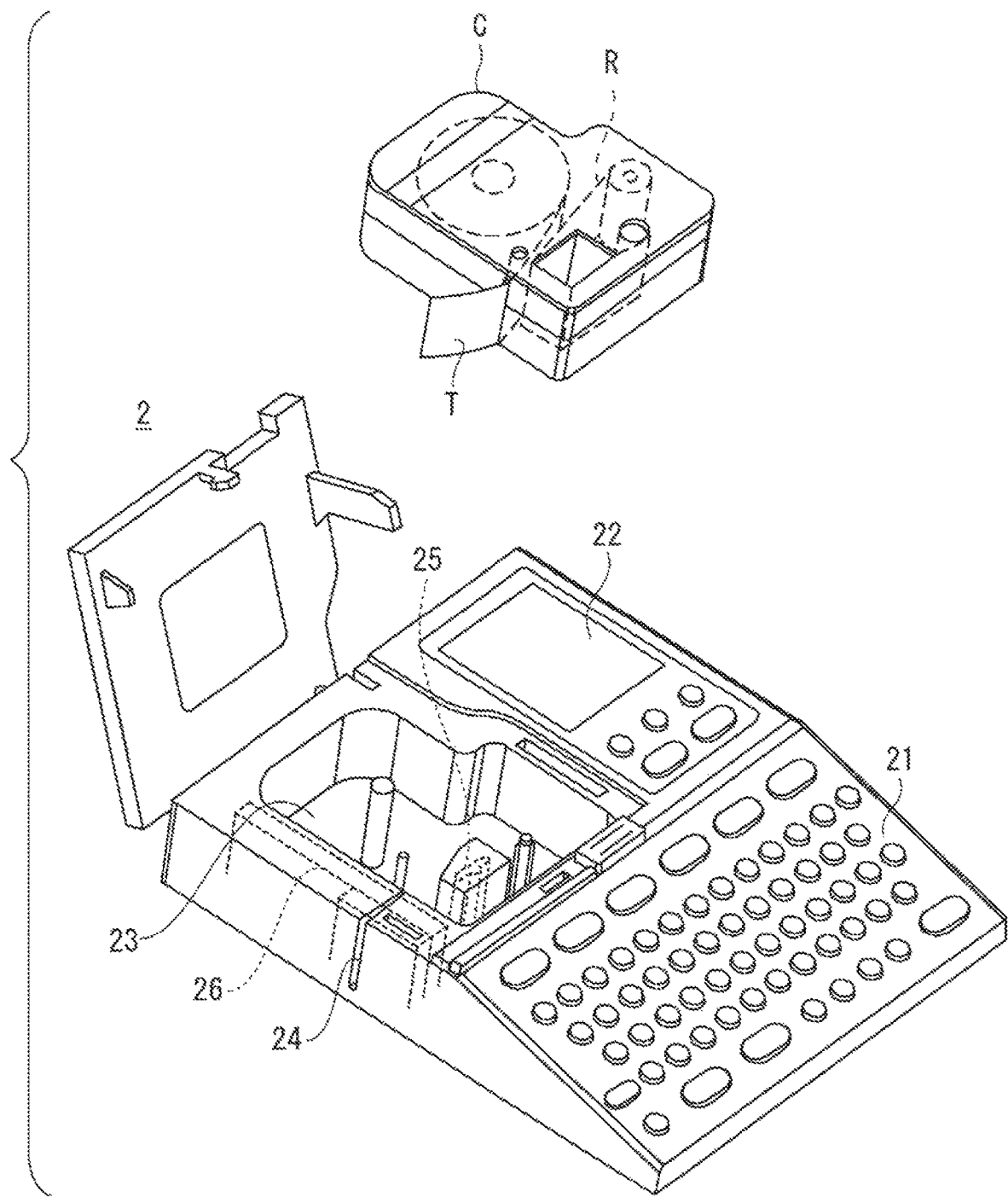
FIG. 2 is a pictorial representation of a tape printing apparatus and a tape cartridge.

In producing a label, a user operating the portable terminal 1 launches the label production application 30 and inputs target tape information indicating the type of a target tape T, which is a tape T desired as a printing target. The portable terminal 1 determines, based on the target tape information input by the user, whether the plurality of printing apparatuses 2 include one or more tape printing apparatuses 2 to each of which a tape cartridge C containing the target tape T is attached, as illustrated in FIG. 2. When it is determined that the one or more tape printing apparatuses 2 to each of which the tape cartridge C containing the target tape T is attached are included, the portable terminal 1 notifies the user of the one or more tape printing apparatuses 2. The user selects the tape printing apparatus 2 for carrying out printing from among the notified tape printing apparatuses 2. According to a printing instruction of the user, the portable terminal 1 generates print data for producing a label and transmits the generated print data to the tape printing apparatus 2 selected by the user.

The tape printing apparatus 2 to which the tape cartridge C containing the target tape T is attached will be referred to as an "attached-tape printing apparatus 2a" hereinbelow. A "corresponding-tape printing apparatus 2b" described later is also illustrated in FIG. 1.

Although FIG. 1 illustrates a smartphone as the portable terminal 1, another device such as a tablet computer or a notebook personal computer (PC) may be used. Although FIG. 1 illustrates three tape printing apparatuses 2 as the tape printing apparatuses 2 communicable with the portable terminal 1, any number of tape printing apparatuses 2 may be used.

FIG. 2 is a pictorial representation of the tape printing apparatus 2 and the tape cartridge C. The tape printing apparatus 2 includes a keyboard 21, a display 22, a cartridge attachment portion 23, and a tape outlet 24.

The keyboard 21 receives various operations, such as editing of an image to be printed. The display 22 displays various types of information, such as an editing screen for editing an image to be printed. The tape cartridge C is detachably attached to the cartridge attachment portion 23. In the tape cartridge C, a tape T and an ink ribbon R are contained within the case.

The cartridge attachment portion 23 is provided with a thermal head 25. The thermal head 25, with the tape cartridge C attached to the cartridge attachment portion 23, performs heat generation driving in accordance with an edited result of an image to be printed. Thereby, ink of the ink ribbon R is transferred onto the tape T, with the result that the image to be printed is printed on the tape T.

The tape T on which printing has been carried out is exhausted from the tape outlet 24. A cutter 26 is provided between the cartridge attachment portion 23 and the tape outlet 24. The cutter 26 cuts the tape T in its width direction. Thus, the printed portion is cut off from the tape T. The cut-off printed portion is used as a label.

The tape printing apparatus 2 is capable of carrying out printing based on an edit result of an image to be printed using the keyboard 21 as well as carrying out printing based on print data transmitted from the portable terminal 1. In the present embodiment, description is given of the latter case in which the tape printing apparatus 2 carries out printing based on print data transmitted from the portable terminal 1.

FIG. 3 is a block diagram illustrating hardware configurations of the portable terminal 1 and the tape printing apparatus 2. The portable terminal 1 includes a touch panel 11, a portable terminal communicator 12, and a portable terminal controller 13. The touch panel 11 is an example of a "display".

The touch panel 11 receives various operations performed by a user and displays various types of information. For example, the touch panel 11 displays screens, such as a target tape information input screen D1 illustrated in FIG. 6 and another drawing, an attached-tape printing apparatus screen D2 illustrated in FIG. 7, a corresponding-tape printing apparatus screen D3 illustrated in FIG. 9, and a no tape printing apparatus notification screen D4 illustrated in FIG. 10.

The portable terminal communicator 12 communicates with the tape printing apparatus 2 via the network NW. For example, the portable terminal communicator 12 transmits print data to the tape printing apparatus 2 and receives, from the tape printing apparatus 2, attached-cartridge information indicating the type of the tape cartridge C attached to the tape printing apparatus 2.

The portable terminal controller 13 includes a portable terminal central processing unit (CPU) 13a, a portable terminal read-only memory (ROM) 13b, and a portable terminal random-access memory (RAM) 13c.

The portable terminal CPU 13a loads, on the portable terminal RAM 13c, various control programs stored in the portable terminal ROM 13b and executes the various control programs, thereby performing various types of control. The portable terminal controller 13 may use, as the processor, hardware circuitry, such as an application specific integrated circuit (ASIC), instead of the portable terminal CPU 13a.

The processor may have a configuration in which one or more CPUs and hardware circuitry, such as the ASIC, operate in cooperation with each other.

The portable terminal ROM 13b, which is a writable ROM, stores various control programs and various types of control data. For example, the portable terminal ROM 13b stores the label production application 30. The label production application 30 is an application program for implementing various functions related to label production illustrated in FIG. 4.

The label production application 30 includes corresponding-cartridge information indicating, for each model of the tape printing apparatus 2, conditions under which the tape cartridge C is able to be used with the model. For example, the corresponding-cartridge information includes information indicating available tape types and available tape widths. The tape types refer to types such as a standard tape and a die-cut tape. The standard tape is a long tape T including a printing layer serving as a printing face and a release paper layer to be removed prior to attachment of the tape T. The die-cut tape is the tape T in which label materials die cut into a predetermined size are arranged at regular intervals on a long mount tape.

When the label production application 30 is started, the portable terminal CPU 13a transmits, to the tape printing apparatuses 2 with which the portable terminal 1 is able to communicate, a model information request signal for requesting model information indicating the model of each of the tape printing apparatuses 2 and obtains the model information from each of the tape printing apparatuses 2. Then, the portable terminal CPU 13a obtains, from the label production application 30, the corresponding-cartridge information for the model information obtained from each of the tape printing apparatuses 2 and determines, based on the obtained corresponding-cartridge information, whether the tape cartridge C containing the target tape T desired as a printing target by the user is usable with each of the tape printing apparatuses 2.

The tape printing apparatus 2 includes a printing apparatus communicator 41, an attached-cartridge information reader 42, a printing section 43, and a printing apparatus controller 44.

The printing apparatus communicator 41 communicates with the portable terminal 1 via the network NW.

The attached-cartridge information reader 42 optically reads a code image affixed as a label on the tape cartridge C attached into the cartridge attachment portion 23 or reads out attached-cartridge information indicating the type of the tape cartridge C from a circuit board including a memory element (both not illustrated) provided in the tape cartridge C. The attached-cartridge information includes information indicating the tape width, tape color, and tape type of the tape T contained in the tape cartridge C.

The printing section 43 is a mechanism for carrying out printing on the tape T and includes the thermal head 25, a feed motor 43a, and a cutter motor 43b. The thermal head 25 includes a plurality of heating elements and carries out printing by thermally transferring ink from the ink ribbon R onto the tape T. The feed motor 43a is a drive source that feeds the tape T and the ink ribbon R. The cutter motor 43b is a drive source for driving the cutter 26.

The printing apparatus controller 44 includes a printing apparatus CPU 44a, a printing apparatus ROM 44b, and a printing apparatus RAM 44c.

The printing apparatus CPU 44a performs various types of control by loading, on the printing apparatus RAM 44c, various control programs stored in the printing apparatus ROM 44b and executing the various control programs. The printing apparatus controller 44 may use, as a processor, hardware circuitry, such as an ASIC, instead of the printing apparatus CPU 44a. The processor may have a configuration in which one or more CPUs and hardware circuitry, such as an ASIC, operate in cooperation with each other.

The printing apparatus ROM 44b stores various control programs such as firmware. The printing apparatus CPU 44a uses a control program stored in the printing apparatus ROM 44b to carry out printing on the tape T unreeled from the tape cartridge C based on print data transmitted from the portable terminal 1. In response to receiving an attached-cartridge information request signal from the portable terminal 1 and in response to replacement of the tape cartridge C, the printing apparatus CPU 44a obtains the attached-cartridge information from the circuit board of the tape cartridge C via the attached-cartridge information reader 42 and transmits the obtained attached-cartridge information to the portable terminal 1.

Figure 4:
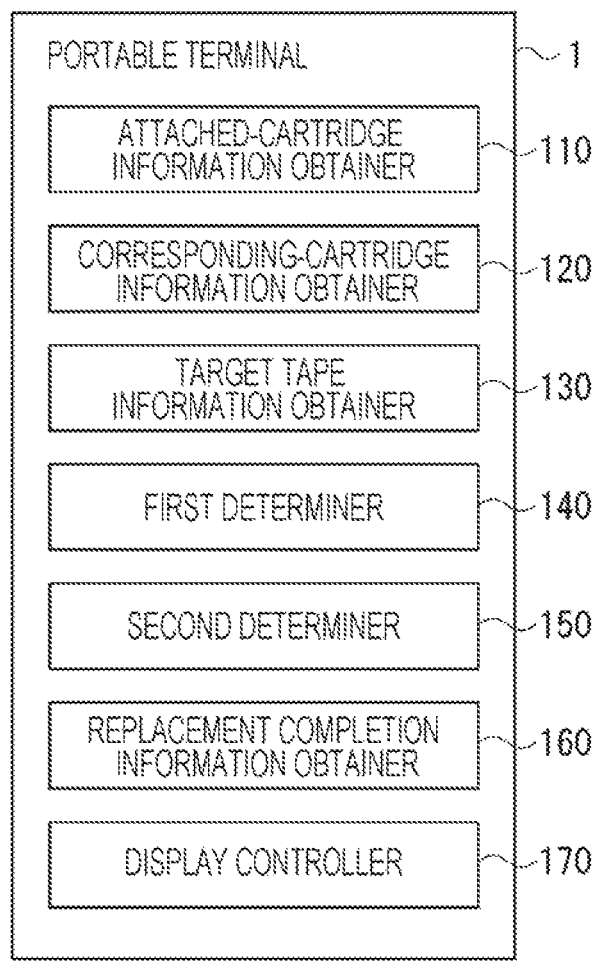
FIG. 4 is a block diagram illustrating a functional configuration of the portable terminal.

FIG. 4 is a block diagram illustrating a functional configuration of the portable terminal 1. The portable terminal 1 includes, as a functional configuration, an attached-cartridge information obtainer 110, a corresponding-cartridge information obtainer 120, a target tape information obtainer 130, a first determiner 140, a second determiner 150, a replacement completion information obtainer 160, and a display controller 170. All of these functions are functions implemented by the portable terminal CPU 13a executing the label production application 30.

Regarding the plurality of tape printing apparatuses 2 communicably connected to the portable terminal 1, the attached-cartridge information obtainer 110 obtains attached-cartridge information indicating the type of the tape cartridge C attached to each of the tape printing apparatuses 2. In the present embodiment, when an image to be printed is edited by the user and an instruction to print the image to be printed is issued, the attached-cartridge information obtainer 110 transmits an attached-cartridge information request signal to the plurality of printing apparatuses 2 and thus obtains attached-cartridge information from each of the tape printing apparatuses 2. In addition, when replacement completion information is obtained by the replacement completion information obtainer 160 described later, the attached-cartridge information obtainer 110 transmits an attached-cartridge information request signal again to the plurality of printing apparatuses 2 and thus obtains attached-cartridge information from each of the tape printing apparatuses 2.

Regarding the plurality of tape printing apparatuses 2 communicably connected to the portable terminal 1, the corresponding-cartridge information obtainer 120 obtains corresponding-cartridge information indicating the conditions of the tape cartridges C respectively usable with the tape printing apparatuses 2. When the label production application 30 is started, the corresponding-cartridge information obtainer 120 transmits a model information request signal to the plurality of tape printing apparatuses 2 communicably connected to the portable terminal 1 and thus obtains model information from each of the tape printing apparatuses 2 and obtains corresponding-cartridge information associated with the obtained model information.

The target tape information obtainer 130 obtains target tape information indicating the type of the target tape T desired as a printing target by the user. The target tape information obtainer 130 obtains, as the target tape information, information input to the target tape information input screen D1 illustrated in FIG. 6 and another drawing.

The first determiner 140 determines, based on the attached-cartridge information of the plurality of tape printing apparatuses 2 obtained by the plurality of attached-cartridge information obtainer 110 and the target tape information obtained by the target tape information obtainer 130, whether the plurality of tape printing apparatuses 2 include the attached-tape printing apparatus 2a, which is the tape printing apparatus 2 to which the target tape cartridge C containing the target tape T is attached. Each time the attached-cartridge information is obtained by the attached-cartridge information obtainer 110, the first determiner 140 determines whether the plurality of tape printing apparatuses 2 include the attached-tape printing apparatus 2a.

When it is determined by the first determiner 140 that the plurality of tape printing apparatuses 2 do not include the attached-tape printing apparatus 2a, the second determiner 150 determines, based on the respective pieces of corresponding-cartridge information for the plurality of tape printing apparatuses 2 and the target tape information obtained by the target tape information obtainer 130, whether the plurality of tape printing apparatuses 2 include the corresponding-tape printing apparatus 2b (refer to FIG. 1), which is the tape printing apparatus 2 with which the target tape cartridge C is usable.

The replacement completion information obtainer 160 obtains replacement completion information indicating that a user replaced the tape cartridge C of the corresponding-tape printing apparatus 2b. In the present embodiment, the replacement completion information obtainer 160 obtains, as the replacement completion information, an operation signal indicating that a third OK button 74 of the corresponding-tape printing apparatus screen D3 illustrated in FIG. 9 is selected.

When it is determined by the first determiner 140 that the plurality of tape printing apparatuses 2 include the attached-tape printing apparatus 2a, the display controller 170 causes the touch panel 11 to display attached-apparatus information indicating the attached-tape printing apparatus 2a. The display controller 170 causes the attached-apparatus information to be displayed on the attached-tape printing apparatus screen D2 illustrated in FIG. 7.

When it is determined by the second determiner 150 that the plurality of tape printing apparatuses 2 include the corresponding-tape printing apparatus 2b, the display controller 170 causes the touch panel 11 to display corresponding apparatus information indicating the corresponding-tape printing apparatus 2b and replacement notification information prompting replacement of the tape cartridge C of the corresponding-tape printing apparatus 2b. The display controller 170 causes the corresponding apparatus information and replacement notification information to be displayed on the corresponding-tape printing apparatus screen D3 illustrated in FIG. 9.

With reference to FIG. 6 to FIG. 10, various screens provided by the label production application 30 will be described with specific display examples. FIG. 5 is a table illustrating corresponding-cartridge information and attached-cartridge information that are prerequisites for display examples illustrated in FIG. 7, FIG. 9, and FIG. 10.

As illustrated in FIG. 5, the portable terminal 1 is communicably connected to three tape printing apparatuses 2 of different models. The portable terminal 1 stores corresponding-cartridge information indicating the conditions of the tape cartridge C usable with each model of the tape printing apparatus 2 in association with the model name of the tape printing apparatus 2. The corresponding-cartridge information includes information indicating the corresponding tape type, standard tape width, and die-cut tape width. The corresponding tape type refers to an available tape type. The standard tape width refers to the available tape width of a standard tape. The die-cut tape width refers to the available tape width of a die-cut tape. For example, the corresponding cartridge information indicates that, regarding the tape printing apparatus 2 of model name "PR-1", the corresponding tape type is only "standard tape", and the tape T with a tape width "24 mm or less" is able to be used for a standard tape. Examples of the model for which a die-cut tape is not able to be used may include the tape printing apparatus 2 on which a sensor for detecting the location of a label material in a die-cut tape is not mounted.

The portable terminal 1 stores the attached-cartridge information obtained from each tape printing apparatus 2 in association with the model name of the tape printing apparatus 2. The portable terminal 1 stores the attached-cartridge information in a given area within the portable terminal RAM 13c illustrated in FIG. 3. The attached-cartridge information includes information indicating the attached-tape width, attached-tape color, and attached-tape type. The attached-tape width, attached-tape color, and attached-tape type respectively refer to the width, color, and type of the tape T contained in the tape cartridge C attached to each of the tape printing apparatuses 2. For example, the attached-cartridge information indicates that the tape cartridge C containing the tape T with an attached-tape width "18 mm", attached-tape color "white", and attached-tape type "standard tape" is attached to the tape printing apparatus 2 of a model name "PR-1".

Figure 6:
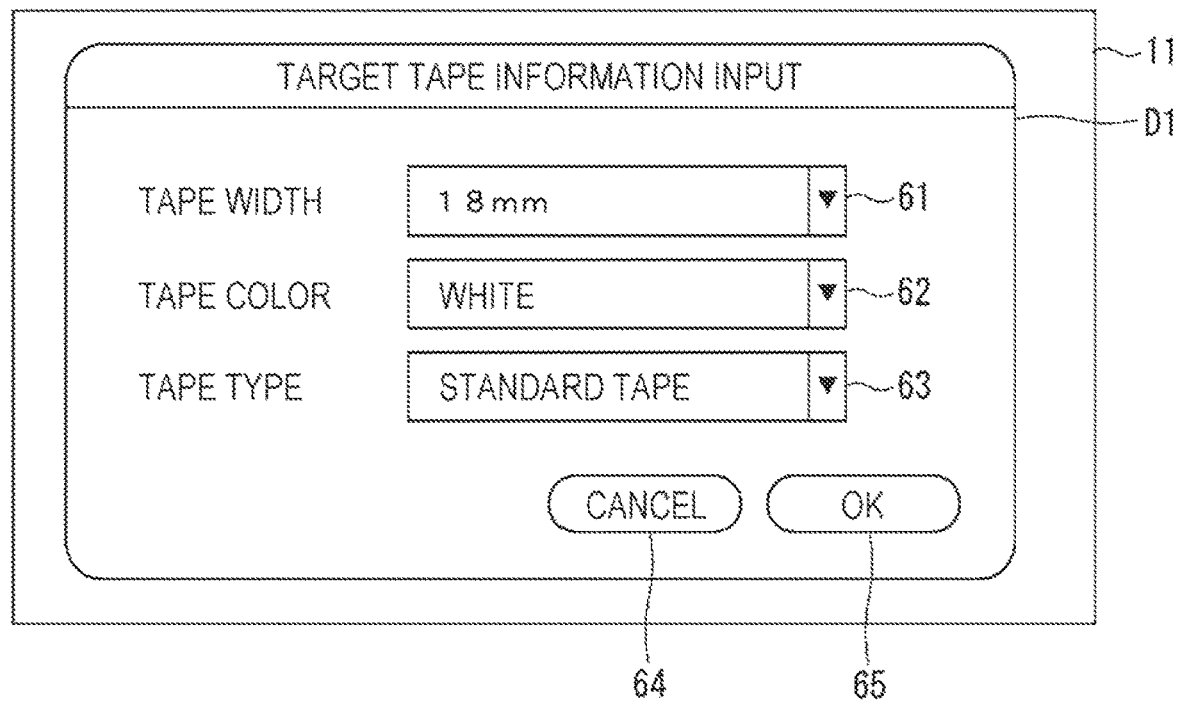
FIG. 6 is a diagram illustrating a display example of a target tape information input screen.
Figure 7:
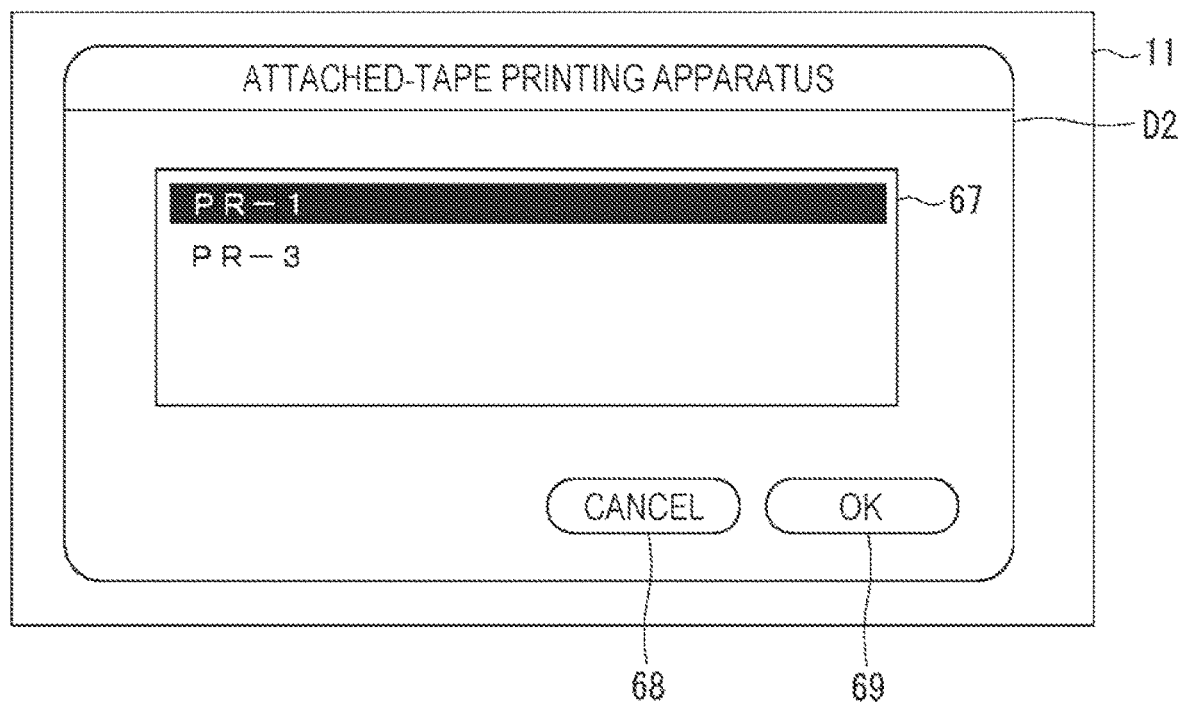
FIG. 7 is a diagram illustrating a display example of an attached-tape printing apparatus screen.

FIG. 6 is a diagram illustrating a display example of the target tape information input screen D1. In the target tape information input screen D1 illustrated in FIG. 6, target tape information serving as prerequisites for the attached-tape printing apparatus screen D2 illustrated in FIG. 7 is input. The target tape information input screen D1 is a screen displayed when the user issues a printing instruction after editing of an image to be printed on the editing screen. The target tape information input screen D1 displays a tape width entry field 61, a tape color entry field 62, a tape type entry field 63, a first cancel button 64, and a first OK button 65.

The tape width of the target tape T desired as a printing target by the user is input to the tape width entry field 61. The tape color of the target tape T desired as the printing target by the user is input to the tape color entry field 62. The tape type of the target tape T desired as the printing target by the user is input to the tape type entry field 63. In the target tape information input screen D1 illustrated in FIG. 6, a tape width "18 mm", a tape color "white" and a tape type "standard tape" are input. When the first cancel button 64 is selected, the portable terminal 1 invalidates information input to the target tape information input screen D1 and displays the editing screen displayed prior to the display of target tape information input screen D1. When the first OK button 65 is selected, the portable terminal 1 obtains, as the target tape information, information input to the target tape information input screen D1.

On the target tape information input screen D1, information is not necessarily needed to be input to all of the tape width entry field 61, the tape color entry field 62, and the tape type entry field 63 but may be input to at least one of the fields.

FIG. 7 is a diagram illustrating a display example of the attached-tape printing apparatus screen D2. In response to obtaining the attached-cartridge information illustrated in FIG. 5 and the target tape information illustrated in FIG. 6, the portable terminal 1 displays the attached-tape printing apparatus screen D2 illustrated in FIG. 7. The attached-tape printing apparatus screen D2 displays an attached-tape printing apparatus display field 67, a second cancel button 68, and a second OK button 69.

In the attached-tape printing apparatus display field 67, a list of model names of the attached-tape printing apparatuses 2a is displayed. As illustrated in FIG. 5, the attached-tape printing apparatuses 2a to each of which the tape cartridge C containing the target tape T that matches the target tape information illustrated in FIG. 6 is attached are two tape printing apparatuses 2 of a model name "PR-1" and a model name "PR-3". The model name "PR-1" and the model name "PR-3" are examples of "attached-apparatus information". The portable terminal 1 determines, as the attached-tape printing apparatus 2a, the tape printing apparatus 2 from which attached-cartridge information satisfying the AND condition of one or more information items input among three information items, the tape width, tape color, and tape type included in the target tape information is obtained.

In the attached-tape printing apparatus display field 67 illustrated in FIG. 7, of the model name "PR-1" and the model name "PR-3", the model name "PR-1" is selected. When the second OK button 69 is selected under this condition, the portable terminal 1 determines that the tape printing apparatus 2 of the model name "PR-1" is selected as the tape printing apparatus 2 for carrying out printing. When the second cancel button 68 is selected, the portable terminal 1 hides the attached-tape printing apparatus screen D2 and displays the target tape information input screen D1 illustrated in FIG. 6, which is displayed prior to the display of the attached-tape printing apparatus screen D2.

FIG. 8 is a diagram illustrating a display example of the target tape information input screen D1, which is different from the example in FIG. 6. In the target tape information input screen D1 illustrated in FIG. 8, a tape width "24 mm", a tape color "red", and a tape type "die-cut tape" are input as target tape information serving as prerequisites for the corresponding-tape printing apparatus screen D3 illustrated in FIG. 9.

FIG. 9 is a diagram illustrating a display example of the corresponding-tape printing apparatus screen D3. In response to obtaining the attached-cartridge information illustrated in FIG. 5 and the target tape information illustrated in FIG. 8, the portable terminal 1 displays the corresponding-tape printing apparatus screen D3 illustrated in FIG. 9. The corresponding-tape printing apparatus screen D3 displays a corresponding-tape printing apparatus display field 71, a first message 72, a third cancel button 73, and the third OK button 74.

In the corresponding-tape printing apparatus display field 71, information regarding the corresponding-tape printing apparatus 2b is displayed. As illustrated in FIG. 5, the three tape printing apparatuses 2 communicably connected to the portable terminal 1 do not include the attached-tape printing apparatus 2a to which the tape cartridge C containing the target tape T that matches the target tape information illustrated in FIG. 8 is attached. However, the three tape printing apparatuses 2 includes the corresponding-tape printing apparatus 2b with which the tape cartridge C containing the target tape T that matches the target tape information illustrated in FIG. 8 is usable.

When it is determined that the plurality of tape printing apparatuses 2 that are able to communicate with the portable terminal 1 include the corresponding-tape printing apparatus 2b, the portable terminal 1 displays the corresponding-tape printing apparatus screen D3 and displays information regarding the corresponding-tape printing apparatus 2b in a corresponding-tape printing apparatus display field 71. In the corresponding-tape printing apparatus display field 71 illustrated in FIG. 8, a model name "PR-2", an attached-tape width "40 mm", an attached-tape color "red", and an attached-tape type "die-cut tape" are displayed as the information regarding the corresponding-tape printing apparatus 2b. The model name "PR-2" is an example of "corresponding apparatus information". Of the information items displayed in the corresponding-tape printing apparatus display field 71, the attached-tape width, the attached-tape color, and the attached-tape type are information items included in the attached-cartridge information of the corresponding-tape printing apparatus 2b.

The first message 72 is a message prompting the user for replacement of the tape cartridge C of the corresponding-tape printing apparatus 2b. The first message 72 is an example of "replacement notification information". According to the first message 72, the user replaces the tape cartridge C of the corresponding-tape printing apparatus 2b and then selects the third OK button 74. In response to selection of the third OK button 74, the portable terminal 1 obtains an operation signal of the third OK button 74b and determines that the tape cartridge C of the corresponding-tape printing apparatus 2b has been replaced. The operation signal of the third OK button 74 is an example of "replacement completion information". Alternatively, when the third cancel button 73 is selected, the portable terminal 1 hides the corresponding tape printing apparatus screen D3 and displays the target tape information input screen D1 (refer to FIG. 8) displayed prior to the display of the corresponding-tape printing apparatus screen D3.

Figure 10:
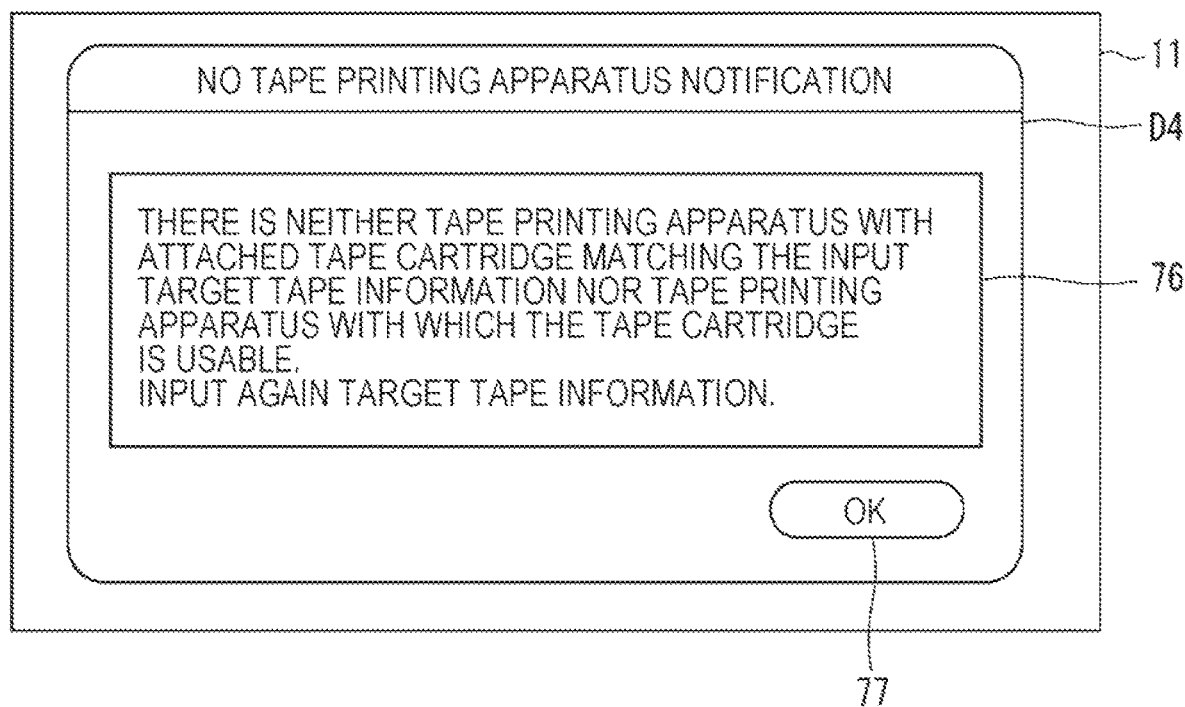
FIG. 10 is a diagram illustrating a display example of a no tape printing apparatus notification screen.

FIG. 10 is a diagram illustrating a display example of the no tape printing apparatus notification screen D4. When it is determined that the plurality of tape printing apparatuses 2 communicable with the portable terminal 1 include neither the attached-tape printing apparatus 2a nor the corresponding-tape printing apparatus 2b, the portable terminal 1 displays the no tape printing apparatus notification screen D4. The no tape printing apparatus notification screen D4 displays a second message 76 and a fourth OK button 77.

The second message 76 includes a message notifying the user that there is neither the attached-tape printing apparatus 2a nor the corresponding-tape printing apparatus 2b, and a message prompting the user to input the target tape information again. After confirming the second message 76, the user selects the fourth OK button 77. When the fourth OK button 77 is selected, the portable terminal 1 hides the no tape printing apparatus notification screen D4 and displays the target tape information input screen D1 displayed prior to the display of the no tape printing apparatus notification screen D4.

Figure 11:
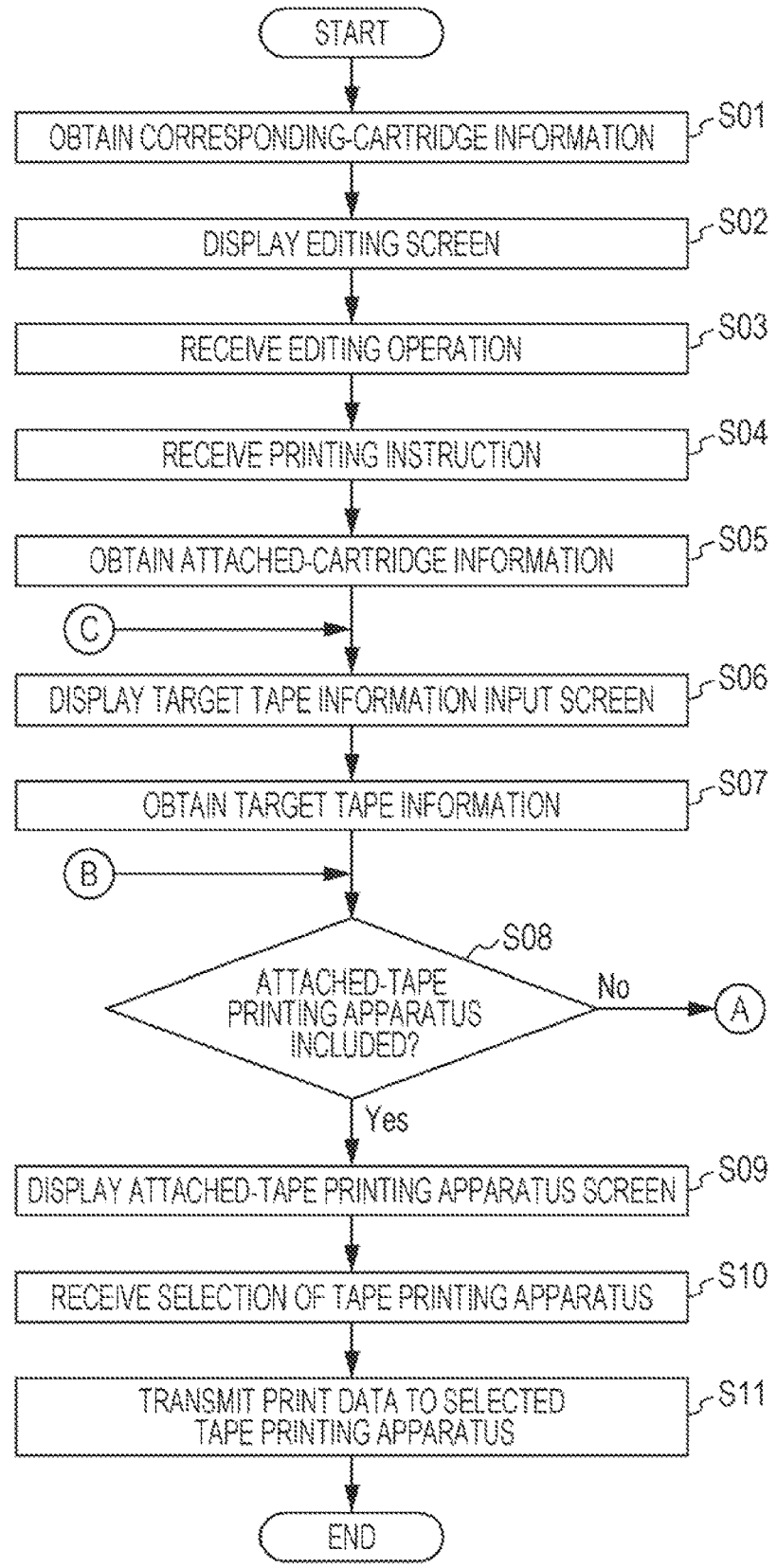
FIG. 11 is a flowchart illustrating a flow of a printing instruction process executed by a portable terminal.

With reference to the flowcharts in FIG. 11 and FIG. 12, the flow of a printing instruction process executed by the portable terminal 1 will be described. The printing instruction process begins when the label production application 30 is started.

In step S01, the portable terminal 1 obtains the corresponding-cartridge information regarding the plurality of tape printing apparatuses 2 communicably connected to the portable terminal 1. The portable terminal 1 transmits a model information request signal to the plurality of tape printing apparatuses 2, so that the portable terminal 1 obtains model information from each of the tape printing apparatuses 2 and obtains corresponding-cartridge information associated with the obtained model information from the label production application 30.

In step S02, the portable terminal 1 displays, on the touch panel 11, an editing screen for editing an image to be printed.

In step S03, the portable terminal 1 receives an editing operation of the user on the editing screen.

In step S04, the portable terminal 1 receives a printing instruction of the user on the editing screen.

In step S05, the portable terminal 1 obtains the attached-cartridge information regarding the plurality of tape printing apparatuses 2 communicably connected to the portable terminal 1. The portable terminal 1 transmits an attached-cartridge information request signal to the plurality of tape printing apparatuses 2 so that the portable terminal 1 obtains attached-cartridge information from each of the tape printing apparatuses 2.

In step S06, the portable terminal 1 displays the target tape information input screen D1 on the touch panel 11.

In step S07, the portable terminal 1 obtains target tape information in response to an input operation of the user on the target tape information input screen D1.

In step S08, the portable terminal 1 determines whether the plurality of tape printing apparatuses 2 communicably connected to the portable terminal 1 include the attached-tape printing apparatus 2a. Using the attached-cartridge information obtained in step S05 and the target tape information obtained in step S07, the portable terminal 1 determines whether the plurality of tape printing apparatuses 2 include the attached-tape printing apparatus 2a. When the portable terminal 1 determines that the plurality of tape printing apparatuses 2 include the attached-tape printing apparatus 2a, the portable terminal 1 proceeds to step S09. When the portable terminal 1 determines that the plurality of tape printing apparatuses 2 do not include the attached-tape printing apparatus 2a, the portable terminal 1 proceeds to step S12 illustrated in FIG. 12.

In step S09, the portable terminal 1 displays the attached-tape printing apparatus screen D2 on the touch panel 11.

In step S10, the portable terminal 1 receives selection of the tape printing apparatus 2 by the user on the attached-tape printing apparatus screen D2.

In step S11, the portable terminal 1 transmits, to the selected tape printing apparatus 2, print data generated based on an editing result of the image to be printed. The portable terminal 1 may generate print data in step S11, that is, when the portable terminal 1 receives selection of the tape printing apparatus 2, or may generate print data after step S04, that is, when the portable terminal 1 receives a printing instruction. After step S11, the portable terminal 1 terminates the printing instruction process.

Figure 12:
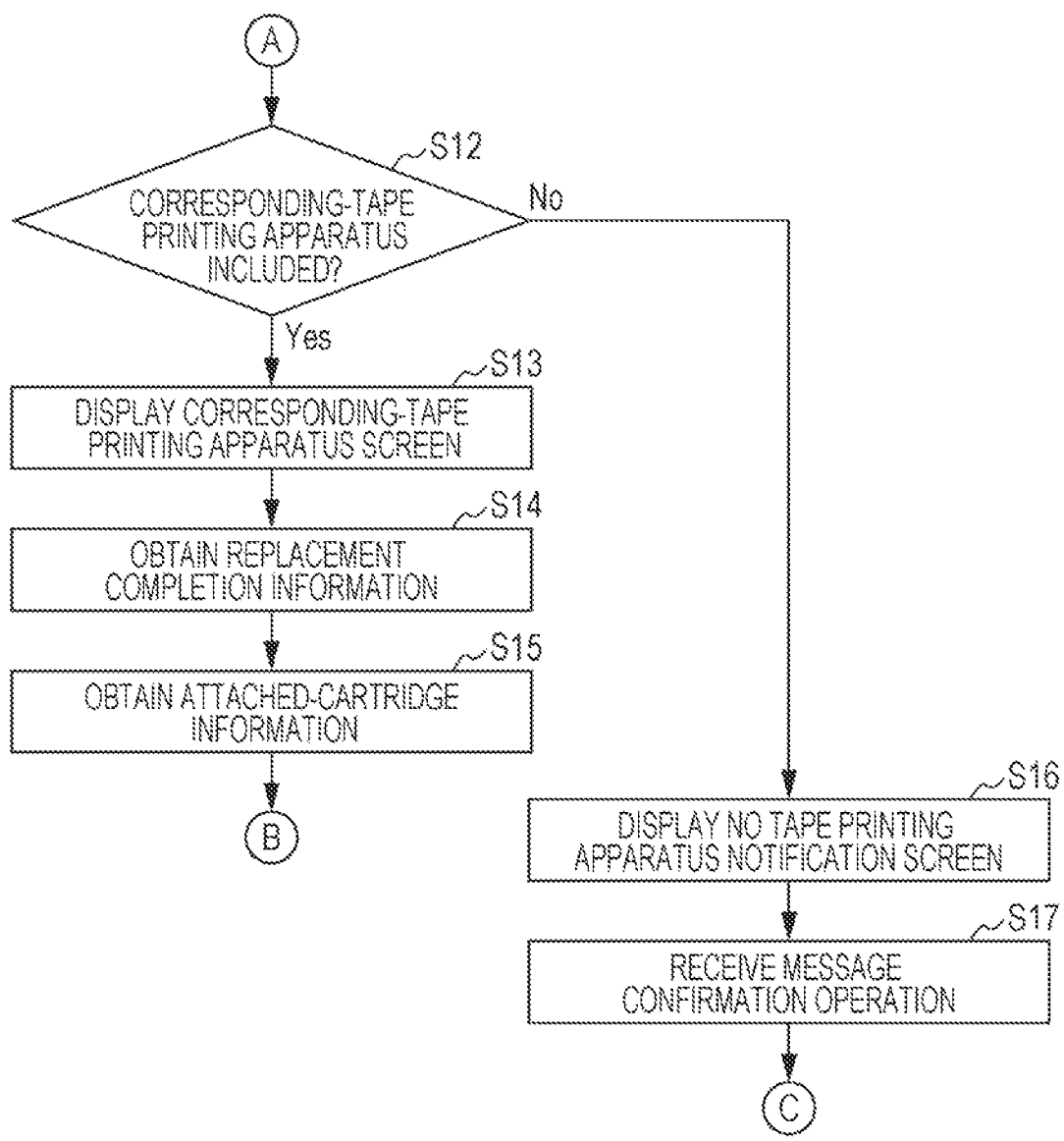
FIG. 12 is a flowchart continuing from the process in FIG. 11.

In step S12 in FIG. 12, the portable terminal 1 determines whether the plurality of tape printing apparatuses 2 communicably connected to the portable terminal 1 include the corresponding-tape printing apparatus 2b. The portable terminal 1 determines, based on the corresponding-cartridge information obtained in step S01 and the target tape information obtained in step S07, whether the plurality of tape printing apparatuses 2 include the corresponding-tape printing apparatus 2b. When it is determined that the plurality of tape printing apparatuses 2 include the corresponding-tape printing apparatus 2b, the portable terminal 1 proceeds to step S13. When it is determined that the plurality of tape printing apparatuses 2 do not include the corresponding-tape printing apparatus 2b, the portable terminal 1 proceeds to step S16.

In step S13, the portable terminal 1 displays the corresponding-tape printing apparatus screen D3 on the touch panel 11.

In step S14, in response to selection of the third OK button 74 of the corresponding-tape printing apparatus screen D3 by the user, the portable terminal 1 obtains replacement completion information indicating that the tape cartridge C of the corresponding-tape printing apparatus 2b has been replaced.

In step S15, the portable terminal 1 obtains the attached-cartridge information regarding the plurality of tape printing apparatuses 2 communicably connected to the portable terminal 1. The portable terminal 1 transmits an attached-cartridge information request signal to the plurality of tape printing apparatuses 2 so that the portable terminal 1 obtains attached-cartridge information from each of the tape printing apparatuses 2. After step S15, the portable terminal 1 proceeds to step S08 in FIG. 11.

In step S16, the portable terminal 1 displays the no tape printing apparatus notification screen D4 on the touch panel 11.

In step S17, in response to selection of the fourth OK button 77 by the user on the no tape printing apparatus notification screen D4, the portable terminal 1 receives a message confirmation operation. After step S17, the portable terminal 1 proceeds to step S06 in FIG. 11.

As described above, the portable terminal 1 according to the present embodiment determines whether the plurality of tape printing apparatuses 2 communicably connected to the portable terminal 1 include the attached-tape printing apparatus 2a to which the target tape cartridge C containing the target tape T desired as a printing target by the user is attached. When it is determined that the attached-tape printing apparatus 2a is included, the portable terminal 1 displays the model name of the attached-tape printing apparatus 2a. With this configuration, the user may rapidly find the tape printing apparatus 2 to which the target tape cartridge C is attached among the plurality of tape printing apparatuses 2.

In addition, when it is determined that the plurality of tape printing apparatuses 2 communicably connected to the portable terminal 1 do not include the attached-tape printing apparatus 2a, the portable terminal 1 determines whether the plurality of tape printing apparatuses 2 include the corresponding-tape printing apparatus 2b. When it is determined that the corresponding-tape printing apparatus 2b is included, the portable terminal 1 displays the model name of the corresponding-tape printing apparatus 2b and the first message 72 prompting replacement of the tape cartridge C of the corresponding-tape printing apparatus 2b. With this configuration, even when the plurality of tape printing apparatuses 2 do not include the attached-tape printing apparatus 2a, the user may confirm that replacement of the tape cartridge C in the tape printing apparatus 2 of the displayed model name enables printing on the tape T desired by the user.

In response to obtaining the replacement completion information indicating that the user replaced the tape cartridge C of the corresponding-tape printing apparatus 2b, the portable terminal 1 obtains again the attached-cartridge information for the plurality of tape printing apparatuses 2 and determines whether the plurality of tape printing apparatuses 2 include the attached-tape printing apparatus 2a. With this configuration, even when the plurality of tape printing apparatuses 2 do not include the attached-tape printing apparatus 2a, the user may replace the tape cartridge C of the tape printing apparatus 2 of the displayed model name and thus confirm the tape printing apparatus 2 to which the target tape cartridge C is attached, on the attached-tape printing apparatus screen D2.

Despite the embodiment described above, modifications described below may be employed.

First Modification

When it is determined by the first determiner 140 that the plurality of tape printing apparatuses 2 communicably connected to the portable terminal 1 include a plurality of attached-tape printing apparatuses 2a, the display controller 170 of the portable terminal 1 may determine, based on a tape-related item included in the attached-cartridge information for the plurality of attached-tape printing apparatuses, priorities of the plurality of attached-tape printing apparatuses 2a and, according to the determined priorities, cause a plurality of model names corresponding to the plurality of attached-tape printing apparatuses 2a to be displayed on the attached-tape printing apparatus screen D2. In this case, the attached-cartridge information obtainer 110 may obtain, from the circuit board, attached-cartridge information indicating the type of the tape cartridge C and the residual amount of the tape T contained in the tape cartridge C. The residual amount of the tape T is an example of the "tape-related item". In this case, each time the tape printing apparatus 2 carries out printing, the tape printing apparatus 2 may calculate the residual amount of the tape T contained in the tape cartridge C after the printing by subtracting the tape usage from the residual amount of the tape T before the printing and write the calculated residual amount of the tape T in the circuit board provided in the tape cartridge C. The display controller 170 of the portable terminal 1 may cause a plurality of model names corresponding to the plurality of attached-tape printing apparatuses 2a to be displayed in order from the smallest residual amount of the tape T in the tape cartridge C attached to the attached-tape printing apparatus 2, that is, such that the attached-tape printing apparatus 2a with a smaller residual amount of the tape T has a higher priority.

The attached-cartridge information obtainer 110 may obtain attached-cartridge information indicating the type of the tape cartridge C and the manufacturing timing of the tape cartridge C. The manufacturing timing of the tape cartridge C is an example of the "tape-related item". This case is based on the premise that the manufacturing timing, such as the date of manufacture, of the tape cartridge C is written on the circuit board provided in the tape cartridge C. The display controller 170 of the portable terminal 1 may cause the plurality of model names corresponding to the plurality of attached-tape printing apparatuses 2a to be displayed in order from the oldest manufacturing timing of the tape cartridge C attached to the attached-tape printing apparatus 2a, that is, such that the attached-tape printing apparatus 2a with an older manufacturing timing of the tape cartridge C has a higher priority.

In this way, the plurality of model names corresponding to the plurality of attached-tape printing apparatuses 2a are displayed with priorities on the attached-tape printing apparatus screen D2, which enables the user to rapidly select the tape printing apparatus 2 for carrying out printing.

Second Modification

When it is determined by the first determiner 140 that the plurality of tape printing apparatuses 2 communicably connected to the portable terminal 1 include a plurality of attached-tape printing apparatuses 2a, the display controller 170 of the portable terminal 1 may determine, based on respective pieces of attached-cartridge information of the plurality of attached-tape printing apparatuses 2a and an image to be printed, priorities of the plurality of attached-tape printing apparatuses 2a and cause the plurality of model names corresponding to the plurality of attached-tape printing apparatuses 2a to be displayed according to the determined priorities on the attached-tape printing apparatus screen D2. More specifically, when the image to be printed includes specific text or a specific image, the display controller 170 may cause a plurality of model names corresponding to the plurality of attached-tape printing apparatuses 2a to be displayed such that the attached-tape printing apparatus 2a to which the tape cartridge C containing the tape T of a specific type is attached has a high priority. For example, when the image to be printed includes the text "prohibit", the display controller 170 may cause a plurality of model names corresponding to the plurality of attached-tape printing apparatuses 2a to be displayed such that the attached-tape printing apparatus 2a to which the tape cartridge C containing the tape T of a specific tape color is attached has a high priority.

In addition, when the image to be printed is created using a specific template or a specific format, the display controller 170 may cause a plurality of model names corresponding to the plurality of attached-tape printing apparatuses 2a to be displayed on the attached-tape printing apparatus screen D2 such that the attached-tape printing apparatus 2a to which the tape cartridge C containing the tape T of a specific type is attached has a high priority. For example, when the image to be printed is created using a template prompting the user to use caution and warning, the display controller 170 may cause a plurality of model names corresponding to the plurality of attached-tape printing apparatuses 2a to be displayed such that the attached-tape printing apparatus 2a to which the tape cartridge C containing the tape T in a specific tape color is attached has a high priority.

Third Modification

The display controller 170 of the portable terminal 1 causes the model name of the tape printing apparatus 2 to be displayed as the attached-apparatus information as well as the corresponding apparatus information but may cause the apparatus name or address of the tape printing apparatus 2 to be displayed. The apparatus name is, for example, a name given to the tape printing apparatus 2 by the user. Thereby, the user uniquely identify the tape printing apparatuses 2 even though they are of the same model. The address is, for example, a MAC address.

Fourth Modification

The portable terminal 1 may obtain attached-cartridge information by transmitting an attached-cartridge information request signal to the tape printing apparatus 2 when the label production application 30 is started or when the editing screen is displayed other than when a printing instruction is given by the user. Alternatively, the portable terminal 1 may obtain attached-cartridge information by routinely transmitting an attached-cartridge information request signal to the tape printing apparatus 2 while the label production application 30 is active. Alternatively, the tape printing apparatus 2 may voluntarily and routinely transmit attached-cartridge information to the portable terminal 1.

Fifth Modification

The portable terminal 1 may be configured to display the target tape information input screen D1 prior to displaying of the editing screen and to determine the tape printing apparatus 2 for carrying out printing prior to editing of an image to be printed. Alternatively, the portable terminal 1 may be configured to call the target tape information input screen D1 from the editing screen and may be configured to determine the tape printing apparatus 2 for carrying out printing while editing an image to be printed.

Sixth Modification

The portable terminal 1 may allow a plurality of pieces of information indicating each of a tape width, a tape color, and a tape type to be input to the target tape information input screen D1 and, using the plurality of pieces of information as the OR condition, determine whether there is the attached-tape printing apparatus 2a and whether there is the corresponding tape printing apparatus 2b. For example, when "18 mm" and "24 mm" are input as information indicating a tape width, the portable terminal 1 may determine the tape printing apparatus 2 to which the tape cartridge C containing the tape T with a tape width of "18 mm" or "24 mm" is attached, as the attached-tape printing apparatus 2a, among a plurality of tape printing apparatuses 2 communicably connected to the portable terminal 1. The portable terminal 1 may allow information indicating a tape material, tape thickness, tape hardness, and other conditions to be input as the target tape information to the target tape information input screen D1.

In addition, the portable terminal 1 may display a target label information input screen (not illustrated) to which target label information including the target tape information and information indicating the color of the ink ribbon R is input, instead of the target tape information input screen D1. The target label information is information indicating the type of a target label, which is a label that the user desires to produce. In addition, the portable terminal 1 may allow the size of a label material of a die-cut tape to be input as the target tape information. The size of a label material refers to the length in the tape-width direction of the label material and the length in the tape-length direction. Furthermore, the portable terminal 1 may allow the label shape of a die-cut tape to be input as the target label information.

Seventh Modification

The replacement completion information obtainer 160 of the portable terminal 1 may obtain replacement completion information from the tape printing apparatus 2. In the present modification, routinely or in response to detecting that the tape cartridge C is attached to the cartridge attachment portion 23, the tape printing apparatus 2 reads out the attached-cartridge information from the circuit board of the tape cartridge C, determines whether the attached-cartridge information read out previously and the attached-cartridge information read out currently match each other, and, if it is determined that they do not match each other, determines that the tape cartridge C has been replaced. Upon determining that the tape cartridge C has been replaced, the tape printing apparatus 2 transmits replacement completion information to the portable terminal 1. When a replacement completion information determiner (not illustrated) of the portable terminal 1 receives the replacement completion information from the tape printing apparatus 2 while displaying the corresponding tape printing apparatus screen D3, the replacement completion information determiner determines whether the tape printing apparatus 2 from which the replacement completion information was transmitted is the corresponding tape printing apparatus 2b. If it is determined by the replacement completion information determiner that the tape printing apparatus 2 from which the replacement completion information was transmitted is the corresponding tape printing apparatus 2b, the replacement completion information obtainer 160 obtains the replacement completion information transmitted from the tape printing apparatus 2.

Eighth Modification

The portable terminal 1 may concurrently transmit a model information request signal and an attached-cartridge information request signal to a plurality of tape printing apparatuses 2 communicably connected to the portable terminal 1. In this case, the portable terminal 1 concurrently obtains the corresponding cartridge information and the attached-cartridge information.

Ninth Modification

The tape printing apparatus 2 may include a detector that detects whether there is a recess or protrusion formed in the tape cartridge C, instead of the attached-cartridge information reader 42, and obtain attached-cartridge information from a detection result of the detector.

Other Modifications

In the embodiment described above, the tape printing apparatus 2 carries out printing by a thermal transfer method. However, the tape printing apparatus 2 may carry out printing by another printing method such as an ink jet method. In the embodiment described above, the tape printing apparatus 2 unreels the tape T contained in the case of the tape cartridge C to carry out printing. However, the tape printing apparatus 2 may unreel the tape T that is not contained in the case of the tape cartridge C to carry out printing. In addition, various changes may be made as appropriate without departing from the scope of the present disclosure.

Appendices

Hereinafter, appendices for an information processing device, a tape printing system, a control method of an information processing device, and a storage medium will be provided.

The portable terminal 1 is the portable terminal 1 to which a plurality of tape printing apparatuses 2, to which the tape cartridges C are able to be attached, are communicably connected. The portable terminal 1 includes the attached-cartridge information obtainer 110 configured to, for the plurality of tape printing apparatuses 2, obtain attached-cartridge information indicating types of the tape cartridges C respectively attached to the tape printing apparatuses 2, the target tape information obtainer 130 configured to obtain target tape information indicating the type of the target tape T that is the tape T desired as a printing target by a user, the first determiner 140 configured to determine, based on the attached-cartridge information for the plurality of tape printing apparatuses 2 and the target tape information, whether the plurality of tape printing apparatuses 2 include the attached-tape printing apparatus 2a to which the target tape cartridge C containing the target tape T is attached, and the display controller 170 configured to, when it is determined by the first determiner 140 that the plurality of tape printing apparatuses 2 include the attached-tape printing apparatus 2*a*, cause the touch panel 11 to display attached-apparatus information indicating the attached-tape printing apparatus 2*a*.

The tape printing system SY is the tape printing system SY including a plurality of tape printing apparatuses 2, to which the tape cartridges C are able to be attached, and the portable terminal 1 to which the plurality of tape printing apparatuses 2 are communicably connected. The portable terminal 1 includes the attached-cartridge information obtainer 110 configured to, for the plurality of tape printing apparatuses 2, obtain attached-cartridge information indicating types of the tape cartridges C respectively attached to the tape printing apparatuses 2, the target tape information obtainer 130 configured to obtain target tape information indicating the type of the target tape T that is the tape T desired as a printing target by a user, the first determiner 140 configured to determine, based on the attached-cartridge information for the plurality of tape printing apparatuses 2 and the target tape information, whether the plurality of tape printing apparatuses 2 include the attached-tape printing apparatus 2*a* to which the target tape cartridge C containing the target tape T is attached, and the display controller 170 configured to, when it is determined by the first determiner 140 that the plurality of tape printing apparatuses 2 include the attached-tape printing apparatus 2*a*, cause the touch panel 11 to display attached-apparatus information indicating the attached-tape printing apparatus 2*a*.

A control method of the portable terminal 1 is a control method of the portable terminal 1 to which a plurality of tape printing apparatuses 2, to which the tape cartridges C are able to be attached, are communicably connected. The control method includes obtaining, for the plurality of tape printing apparatuses 2, attached-cartridge information indicating the types of the tape cartridges C respectively attached to the tape printing apparatuses 2, obtaining target tape information indicating the type of the target tape T that is the tape T desired as a printing target by a user, determining, based on the attached-cartridge information for the plurality of tape printing apparatuses 2 and the target tape information, whether the plurality of tape printing apparatuses 2 include the attached-tape printing apparatus 2*a* to which the target tape cartridge C containing the target tape T is attached, and causing the touch panel 11 to display attached-apparatus information indicating the attached-tape printing apparatus 2*a*, when it is determined that the plurality of tape printing apparatuses 2 include the attached-tape printing apparatus 2*a*.

The label production application 30 causes the portable terminal 1 to execute a process. A plurality of tape printing apparatuses 2, to which the tape cartridges C are able to be attached, are communicably connected to the portable terminal 1. The process includes obtaining, for the plurality of tape printing apparatuses 2, attached-cartridge information indicating types of the tape cartridges C respectively attached to the tape printing apparatuses 2, obtaining target tape information indicating the type of the target tape T that is the tape T desired as a printing target by a user, determining, based on the attached-cartridge information for the plurality of tape printing apparatuses 2 and the target tape information, whether the plurality of tape printing apparatuses 2 include the attached-tape printing apparatus 2*a* to which the target tape cartridge C containing the target tape T is attached, and causing the touch panel 11 to display attached-apparatus information indicating the attached-tape printing apparatus 2*a*, when it is determined that the plurality of tape printing apparatuses 2 include the attached-tape printing apparatus 2*a*.

The portable terminal 1 determines whether the plurality of tape printing apparatuses 2 communicably connected to the portable terminal 1 include the attached-tape printing apparatus 2*a* to which the target tape cartridge C containing the target tape T desired as a printing target by the user. When it is determined that the attached-tape printing apparatus 2*a* is included, the portable terminal 1 displays the attached-apparatus information indicating the attached-tape printing apparatus 2*a*. With this configuration, the user may rapidly find the tape printing apparatus 2 to which the target tape cartridge C is attached among the plurality of tape printing apparatuses 2.

The portable terminal 1 described above may further include the corresponding-cartridge information obtainer 120 configured to, for the plurality of tape printing apparatuses 2, obtain corresponding-cartridge information indicating conditions of the tape cartridges C respectively usable with the tape printing apparatuses 2, and the second determiner 150 configured to, when it is determined by the first determiner 140 that the plurality of tape printing apparatuses 2 do not include the attached-tape printing apparatus 2*a*, determine, based on the corresponding-cartridge information for the plurality of tape printing apparatuses 2 and on the target tape information, whether the plurality of tape printing apparatuses 2 include the corresponding-tape printing apparatus 2*b* with which the target tape cartridge C is usable. The display controller 170 may be configured to, when it is determined by the second determiner 150 that the plurality of tape printing apparatuses 2 include the corresponding-tape printing apparatus 2*b*, cause the touch panel 11 to display corresponding apparatus information indicating the corresponding-tape printing apparatus 2*b* and replacement notification information prompting replacement of the tape cartridge C of the corresponding-tape printing apparatus 2*b*.

When it is determined that the plurality of tape printing apparatuses 2 communicably connected to the portable terminal 1 do not include the attached-tape printing apparatus 2*a*, the portable terminal 1 determines whether the plurality of tape printing apparatuses 2 include the corresponding-tape printing apparatus 2*b*. When it is determined that the corresponding-tape printing apparatus 2*b* is included, the portable terminal 1 displays the corresponding apparatus information indicating the corresponding-tape printing apparatus 2*b* and the exchange notification information prompting replacement of the tape cartridge C of the corresponding-tape printing apparatus 2*b*. With this configuration, even when the plurality of tape printing apparatuses 2 do not include the attached-tape printing apparatus 2*a*, the user may confirm that replacement of the tape cartridge C in the tape printing apparatus 2 indicated by the displayed corresponding apparatus information enables printing on the tape T desired by the user.

The portable terminal 1 described above may further include the replacement completion information obtainer 160 configured to obtain replacement completion information indicating that a user replaced the tape cartridge C of the corresponding-tape printing apparatus 2*b*. The attached-cartridge information obtainer 110 may be configured to, when the replacement completion information is obtained by the replacement completion information obtainer 160, obtain again the attached-cartridge information for the plurality of tape printing apparatuses 2, and the first determiner 140 may be configured to, whenever the attached-cartridge information is obtained by the attached-cartridge information obtainer 110, determine whether the plurality of tape printing apparatuses 2 include the attached-tape printing apparatus 2a.

In response to obtaining the replacement completion information indicating that the user replaced the tape cartridge C of the corresponding-tape printing apparatus 2b, the portable terminal 1 obtains again the attached-cartridge information for the plurality of tape printing apparatuses 2 and determines whether the plurality of tape printing apparatuses 2 include the attached-tape printing apparatus 2a. With this configuration, even when the plurality of tape printing apparatuses 2 do not include the attached-tape printing apparatus 2a, the user may replace the tape cartridge C of the tape printing apparatus 2 indicated by the displayed corresponding apparatus information and thus confirm the tape printing apparatus 2 to which the target tape cartridge C is attached.

In the portable terminal 1 described above, the attached-cartridge information obtainer 110 may be configured to obtain the attached-cartridge information indicating the type of the tape cartridge C and a tape-related item that is a residual amount of the tape T contained in the tape cartridge C or the manufacturing timing of the tape cartridge C, and the display controller 170 may be configured to, when it is determined by the first determiner 140 that the plurality of tape printing apparatuses 2 include a plurality of the attached-tape printing apparatuses 2a, determine, based on a tape-related item included in the attached-cartridge information for the plurality of attached-tape printing apparatuses 2a, priorities of the plurality of attached-tape printing apparatuses 2a and to cause the touch panel 11 to display, according to the determined priorities, a plurality of pieces of the attached-apparatus information corresponding to the plurality of attached-tape printing apparatuses 2a.

When it is determined that the plurality of tape printing apparatuses 2 include a plurality of attached-tape printing apparatuses 2a, the portable terminal 1 determines, based on a tape-related item included in the attached-cartridge information for the attached-tape printing apparatuses 2a, priorities of the plurality of attached-tape printing apparatuses 2a and, according to the determined priorities, displays a plurality of pieces of the attached-apparatus information corresponding to the plurality of attached-tape printing apparatuses 2a. With this configuration, the user may rapidly select the tape printing apparatus 2 for carrying out printing.

What is claimed is:

1. An information processing device to which a plurality of tape printing apparatuses are communicably connected, wherein tape cartridges are able to be attached to the tape printing apparatuses, the information processing device comprising:
    an attached-cartridge information obtainer configured to, for the plurality of tape printing apparatuses, obtain attached-cartridge information indicating types of the tape cartridges respectively attached to the tape printing apparatuses;
    a target tape information obtainer configured to obtain target tape information indicating a type of a target tape that is a tape desired as a printing target by a user;
    a first determiner configured to determine, based on the attached-cartridge information for the plurality of tape printing apparatuses and the target tape information, whether the plurality of tape printing apparatuses include an attached-tape printing apparatus to which a target tape cartridge containing the target tape is attached; and
    a display controller configured to, when it is determined by the first determiner that the plurality of tape printing apparatuses include the attached-tape printing apparatus, cause a display to display attached-apparatus information indicating the attached-tape printing apparatus.

2. The information processing device according to claim 1, further comprising:
    a corresponding-cartridge information obtainer configured to, for the plurality of tape printing apparatuses, obtain corresponding-cartridge information indicating conditions of the tape cartridges respectively usable with the tape printing apparatuses; and
    a second determiner configured to, when it is determined by the first determiner that the plurality of tape printing apparatuses do not include the attached-tape printing apparatus, determine, based on the corresponding-cartridge information for the plurality of tape printing apparatuses and on the target tape information, whether the plurality of tape printing apparatuses include a corresponding-tape printing apparatus with which the target tape cartridge is usable, wherein
    the display controller is configured to, when it is determined by the second determiner that the plurality of tape printing apparatuses include the corresponding-tape printing apparatus, cause the display to display corresponding apparatus information indicating the corresponding-tape printing apparatus and replacement notification information prompting replacement of the tape cartridge of the corresponding-tape printing apparatus.

3. The information processing device according to claim 2, further comprising:
    a replacement completion information obtainer configured to obtain replacement completion information indicating that a user replaced the tape cartridge of the corresponding-tape printing apparatus, wherein
    the attached-cartridge information obtainer is configured to, when the replacement completion information is obtained by the replacement completion information obtainer, obtain again the attached-cartridge information for the plurality of tape printing apparatuses, and
    the first determiner is configured to, whenever the attached-cartridge information is obtained by the attached-cartridge information obtainer, determine whether the plurality of tape printing apparatuses include the attached-tape printing apparatus.

4. The information processing device according to claim 1, wherein
    the attached-cartridge information obtainer is configured to obtain the attached-cartridge information indicating a type of the tape cartridge and a tape-related item that is a residual amount of the tape contained in the tape cartridge or a manufacturing timing of the tape cartridge, and
    the display controller is configured to, when it is determined by the first determiner that the plurality of tape printing apparatuses include a plurality of the attached-tape printing apparatuses, determine, based on a tape-related item of the attached-cartridge information for the plurality of attached-tape printing apparatuses, priorities of the plurality of attached-tape printing apparatuses and cause the display to display, according to the determined priorities, a plurality of pieces of the attached-apparatus information corresponding to the plurality of attached-tape printing apparatuses.

5. A tape printing system comprising a plurality of tape printing apparatuses to which tape cartridges are able to be attached, and an information processing device to which the plurality of tape printing apparatuses are communicably connected, wherein the information processing device includes:
an attached-cartridge information obtainer configured to, for the plurality of tape printing apparatuses, obtain attached-cartridge information indicating types of the tape cartridges respectively attached to the tape printing apparatuses;
a target tape information obtainer configured to obtain target tape information indicating a type of a target tape that is a tape desired as a printing target by a user;
a first determiner configured to determine, based on the attached-cartridge information for the plurality of tape printing apparatuses and the target tape information, whether the plurality of tape printing apparatuses include an attached-tape printing apparatus to which a target tape cartridge containing the target tape is attached; and
a display controller configured to, when it is determined by the first determiner that the plurality of tape printing apparatuses include the attached-tape printing apparatus, cause a display to display attached-apparatus information indicating the attached-tape printing apparatus.

6. A control method of an information processing device to which a plurality of tape printing apparatuses are communicably connected, wherein tape cartridges are able to be attached to the plurality of tape printing apparatuses, the control method comprising:

obtaining, for the plurality of tape printing apparatuses, attached-cartridge information indicating types of the tape cartridges respectively attached to the tape printing apparatuses;
obtaining target tape information indicating a type of a target tape that is a tape desired as a printing target by a user;
determining, based on the attached-cartridge information for the plurality of tape printing apparatuses and the target tape information, whether the plurality of tape printing apparatuses include an attached-tape printing apparatus to which a target tape cartridge containing the target tape is attached; and
causing a display to display attached-apparatus information indicating the attached-tape printing apparatus, when it is determined that the plurality of tape printing apparatuses include the attached-tape printing apparatus.

7. A non-transitory computer-readable storage medium storing a program that causes an information processing device to execute a process, wherein a plurality of tape printing apparatuses, to which tape cartridges are able to be attached, are communicably connected to the information processing device, the process comprising:

obtaining, for the plurality of tape printing apparatuses, attached-cartridge information indicating types of the tape cartridges respectively attached to the tape printing apparatuses;
obtaining target tape information indicating a type of a target tape that is a tape desired as a printing target by a user;
determining, based on the attached-cartridge information for the plurality of tape printing apparatuses and the target tape information, whether the plurality of tape printing apparatuses include an attached-tape printing apparatus to which a target tape cartridge containing the target tape is attached; and
causing a display to display attached-apparatus information indicating the attached-tape printing apparatus, when it is determined that the plurality of tape printing apparatuses include the attached-tape printing apparatus.

* * * * *